(12) United States Patent
Yamashita

(10) Patent No.: US 12,340,072 B2
(45) Date of Patent: Jun. 24, 2025

(54) ELECTRONIC DEVICE, METHOD FOR CONTROLLING ELECTRONIC DEVICE, AND PROGRAM

(71) Applicant: CASIO COMPUTER CO., LTD., Tokyo (JP)

(72) Inventor: Kakeru Yamashita, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 67 days.

(21) Appl. No.: 18/205,650

(22) Filed: Jun. 5, 2023

(65) Prior Publication Data

US 2024/0176463 A1 May 30, 2024

(30) Foreign Application Priority Data

Jun. 21, 2022 (JP) ................................ 2022-099645

(51) Int. Cl.
*G06F 3/0488* (2022.01)
*G06F 3/0484* (2022.01)
*G06F 40/242* (2020.01)

(52) U.S. Cl.
CPC .......... *G06F 3/0484* (2013.01); *G06F 3/0488* (2013.01); *G06F 40/242* (2020.01)

(58) Field of Classification Search
CPC ................................................ G06F 3/048–05
See application file for complete search history.

(56) References Cited

U.S. PATENT DOCUMENTS

| | | | | |
|---|---|---|---|---|
| 5,822,720 A | * | 10/1998 | Bookman | G09B 19/06 345/157 |
| 6,128,635 A | * | 10/2000 | Ikeno | G06F 16/94 715/272 |
| 8,542,205 B1 | * | 9/2013 | Keller | G06F 16/332 345/173 |
| 2011/0115825 A1 | * | 5/2011 | Tetsuhashi | G06F 40/169 345/672 |

(Continued)

FOREIGN PATENT DOCUMENTS

JP 2010015515 A 1/2010
JP 5509976 B2 6/2014

(Continued)

OTHER PUBLICATIONS gutenberg.org, "Webster's Unabridged Dictionary", available on Nov. 14, 2020, archived at <<web.archive.org>>, available at <<https://www.gutenberg.org/cache/epub/29765/pg29765-images.html>>, 4 pages (Year: 2020).*

(Continued)

*Primary Examiner* — Daniel Rodriguez
(74) *Attorney, Agent, or Firm* — Holtz, Holtz & Volek PC

(57) ABSTRACT

According to one embodiment, an electronic device includes a display, a touch panel for detecting a user operation, and a controller. The controller determines, in response to detecting a swipe operation while an entry word is displayed on the display, whether or not a detected location of the swipe operation is within a predetermined area of the touch panel. If the detected location is determined to be within the predetermined area, the controller accepts the swipe operation as an operation for conducting a tag setting process for a tag associated with the entry word.

15 Claims, 11 Drawing Sheets

(56) References Cited

U.S. PATENT DOCUMENTS

| | | | |
|---|---|---|---|
| 2011/0131487 A1* | 6/2011 | Nakajima | G06F 40/169 715/259 |
| 2012/0023436 A1* | 1/2012 | Brown | G06F 3/0488 715/810 |
| 2012/0240075 A1* | 9/2012 | Kim | G06F 3/0481 715/776 |
| 2012/0311509 A1* | 12/2012 | Maggiotto | G06F 3/04817 715/863 |
| 2014/0019885 A1* | 1/2014 | Jung | H04M 1/7243 715/758 |
| 2014/0240101 A1* | 8/2014 | Uno | G06F 3/04883 340/10.51 |
| 2015/0169169 A1* | 6/2015 | Andersson | G06F 3/04845 715/765 |
| 2015/0234799 A1* | 8/2015 | Cho | G06F 3/04883 715/708 |
| 2016/0210687 A1* | 7/2016 | Grace | G06Q 30/02 |
| 2019/0311026 A1* | 10/2019 | Hicks | G06F 3/013 |
| 2020/0104023 A1* | 4/2020 | Yoshida | G06F 3/04883 |
| 2020/0104374 A1* | 4/2020 | Yoshida | G06F 40/53 |

FOREIGN PATENT DOCUMENTS

| | | |
|---|---|---|
| JP | 2014186065 A | 10/2014 |
| JP | 2015135596 A | 7/2015 |
| JP | 2017010365 A | 1/2017 |
| JP | 2021068183 A | 4/2021 |

OTHER PUBLICATIONS

Japanese Office Action (and an English language translation thereof) dated Sep. 3, 2024, issued in counterpart Japanese Application No. 2022-099645.

Extended European Search Report (EESR) dated Nov. 22, 2023, issued in counterpart European Application No. 23177524.8.

Japanese Pre-Appeal Examination Report (and an English language translation thereof) dated Mar. 10, 2025, issued in counterpart Japanese Application No. 2022-099645.

* cited by examiner

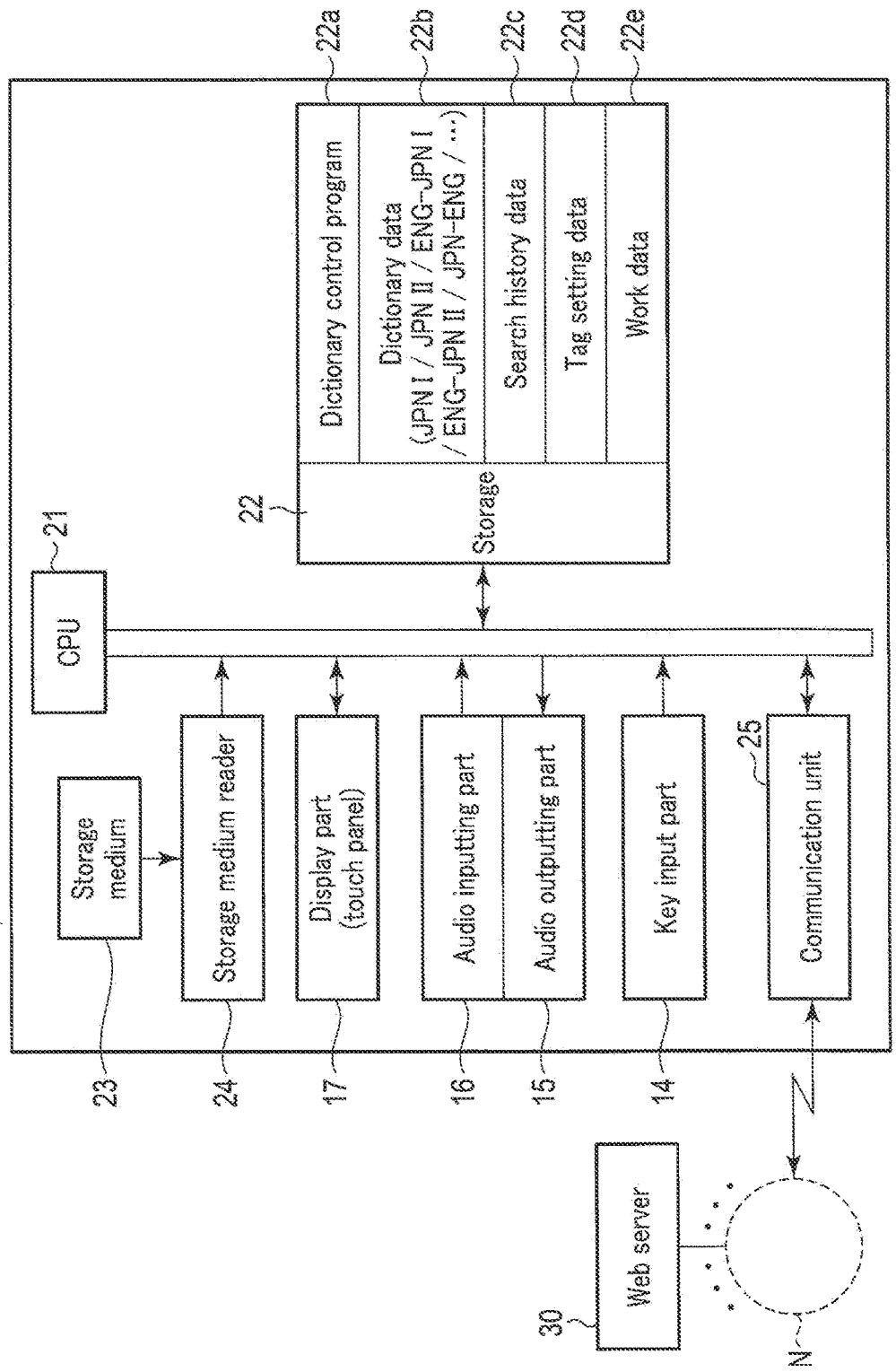
F I G. 2

22d (Tag setting data)

| Dictionary | Entry word | Tag setting Present / None (Removed) | Number of times of setting | Color (type) | Memo |
|---|---|---|---|---|---|
| JPN II | あ | Present | 1 | Red | |
| JPN I | エーノーク [絵馬] | Present | 1 | Yellow | テスト |
| JPN II | フグ | Present | 2 | Red | 資格 |
| JPN I | かし [樫] | Present (None) | 3 | Yellow | 重要 |
| JPN I | あ (音節) | Present | 1 | Red | 小 |
| P-term | provider | Present | 1 | Green | ネット |
| ENG-JPN I | establish | Present | 2 | Blue | テスト |
| ⋮ | ⋮ | ⋮ | ⋮ | ⋮ | ⋮ |

F I G. 3

ELECTRONIC DEVICE, METHOD FOR CONTROLLING ELECTRONIC DEVICE, AND PROGRAM

CROSS-REFERENCE TO RELATED APPLICATION(S)

This application is based upon and claims the benefit of priority from prior Japanese Patent Application No. 2022-099645, filed Jun. 21, 2022, the entire contents of which are incorporated herein by reference.

FIELD

The disclosure herein relates generally to an electronic device, a method for controlling an electronic device, and a program.

BACKGROUND

Electronic dictionaries are widely used on occasions where, for example, students look for explanatory information for a word such as a translation, a meaning, and a sample sentence during their learning activities.

An electronic dictionary stores various sets of dictionary data such as English-Japanese dictionary data and Japanese-English dictionary data in its internal memory, e.g., a ROM. In response to a user inputting a word, an electronic dictionary searches the stored dictionary data for an entry word corresponding to the input word, retrieves explanatory information such as a translation, a meaning, and a sample sentence associated with the entry word, and presents the retrieved explanatory information through a display screen so as to facilitate the learning of the word by the user.

It is common in the cases of using a paper dictionary that a user who is interested in a given word (an entry word) puts a sticky note at a location on the page that shows this entry word so that the user can easily return to it later. For example, Jpn. Pat. Appln. KOKAI Publication No. 2010-015515 discusses an electronic dictionary which has a function of storing tag data (i.e., putting a sticky note) in association with a desired entry word among dictionary data so that the word that interests the user can be readily checked.

SUMMARY

According to the disclosure herein, an electronic device includes a display, a touch panel for detecting a user operation, and a controller. The controller determines, in response to detecting a swipe operation while an entry word is displayed on the display, whether or not a detected location of the swipe operation is within a predetermined area of the touch panel. If the detected location is determined to be within the predetermined area, the controller accepts the swipe operation as an operation for conducting a tag setting process for a tag associated with the entry word.

BRIEF DESCRIPTION OF THE DRAWINGS

FIG. 2 is a block diagram showing an electronic circuitry configuration of the electronic dictionary 10.

FIG. 3 is a diagram showing an example of tag setting data (22d) stored in a tag setting data storage region 22d of the electronic dictionary 10.

DETAILED DESCRIPTION

Embodiments of the invention will be described with reference to the drawings.

Configurations for Embodiments

Figure 1:
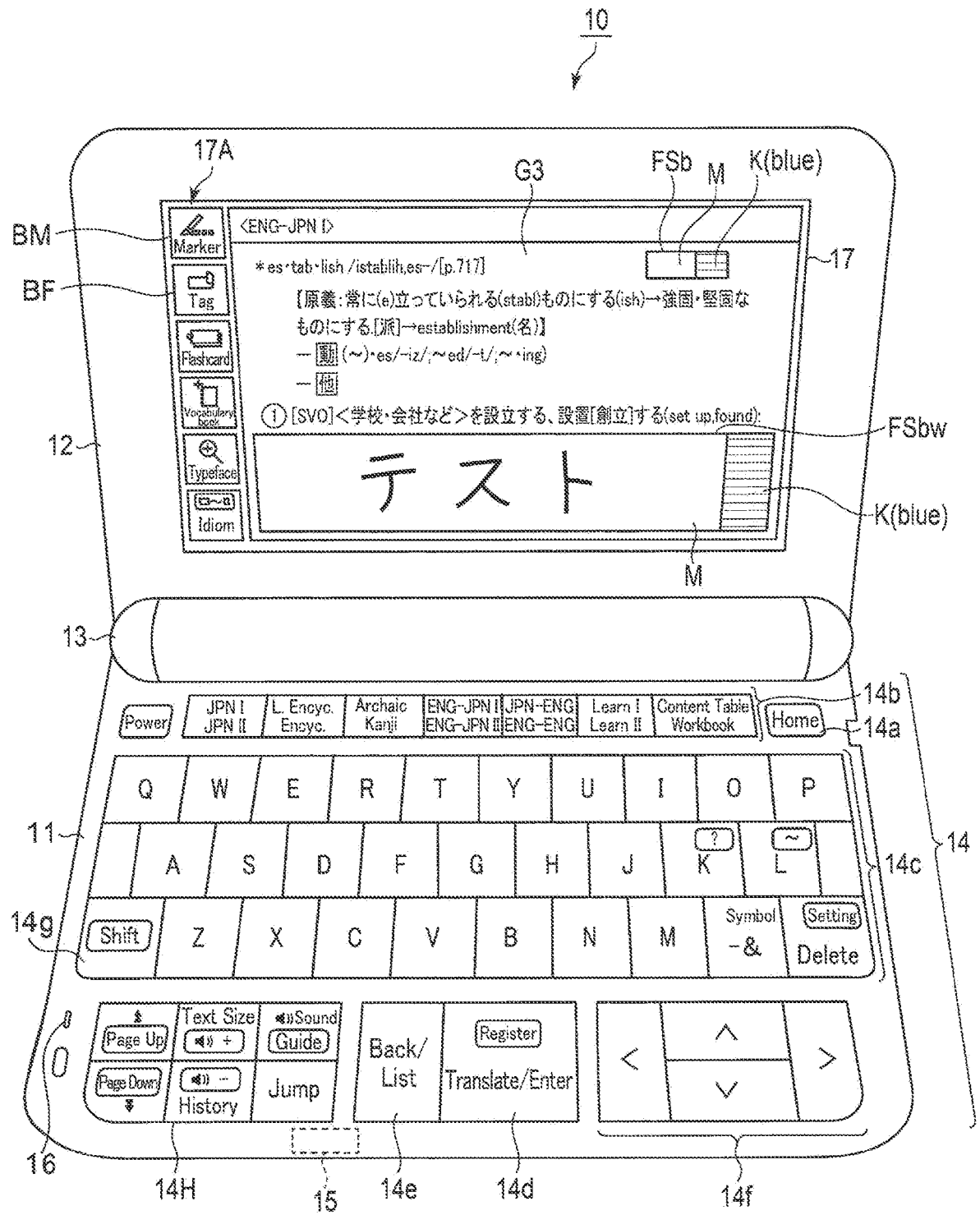
FIG. 1 is a diagram showing an external design of an electronic dictionary 10 as an exemplary embodiment based on an electronic device, a method for controlling an electronic device, and a program according to the disclosure herein.

FIG. 1 is a diagram showing an external design of an electronic dictionary 10 according to an exemplary embodiment.

The electronic dictionary 10 may be implemented in various forms including a dedicated electronic dictionary such as the one as will be described, instruments having a dictionary search function such as a tablet-type personal digital assistant (PDA), a personal computer (PC), a cellular phone, an electronic book, and a portable game device, and so on.

The electronic dictionary 10 may be of a foldable case structure constituted by a main case 11 and a cover case 12 coupled via a hinge 13, so that it can open and close. The main case 11 is furnished with a key input part (keyboard) 14, an audio outputting part 15, and an audio inputting part 16 in its top surface with the foldable case structure opened. The key input part 14 includes a [Home] key 14a, function designation keys 14b, character input keys 14c, a [Translate/Enter] key 14d, a [Back/List] key 14e, cursor keys 14f, a [Shift] key 14g, a [History] key 14H, etc. The cover case 12 is furnished with a touch panel display part (display) 17 in its top surface with the foldable case structure opened. The touch panel display part 17 is a combination of a touch position detector and a display device, and is adapted to detect positions or locations of the touch of a user with a stylus pen or a finger. The touch panel display part 17 is constituted by a transparent touch panel placed over a color liquid-crystal display screen with a back light.

The left end of the touch panel display part 17 is a touch icon area 17A where touch icons (e.g., a [Marker] icon BM and a [Tag] icon BF) are displayed so that operations corresponding to pressing of keys in the key input part 14 and designation of given functions of the electronic dictionary 10 can be performed through touch operations.

The function designation keys 14b in the key input part 14 are to directly designate dictionary contents (e.g., [Large Encyclopedia] and [Encyclopedia]), categories of dictionary contents (e.g., [Japanese], [Archaic], [Kanji], and [English-Japanese]), categories of learning contents (e.g., [Learn]), a content table, and a given tool (e.g., a category [Workbook]), indicated on the respective keys.

One or more keys in the key input part 14 are adapted so that they can each serve as a key for a boxed function (not as a key for a function without a box) indicated on the key top, upon being operated subsequently to the [Shift] key 14g. For example, if the [Translate/Enter] key 14d is operated subsequently to operating the [Shift] key 14g (hereinafter, a functional key by such a combined operation may be denoted as "a [Shift]+[Enter] key"), the [Translate/Enter] key 14d serves as a [Register] key for activating a function for registering a data item specified as a registration subject. Also, a [Shift]+[Delete] key serves as a [Setting] key.

The electronic dictionary 10 according to an embodiment has a tag function for setting and removing tag data in association with an entry word based on a swipe operation performed by a user on an entry word explanatory screen G3 that is displayed upon search and retrieval for the entry word. The swipe operation is one example of a gesture operation.

The swipe operation may include not only a swipe operation TW (as in FIGS. 7 and 8) performed with a touch pen P or a fingertip on the entry word explanatory screen G3 displayed on the touch panel display part 17, but also a drag operation performed with a mouse cursor or a mouse pointer appearing on the screen.

The electronic dictionary 10 shown in FIG. 1 is in a state of displaying the entry word explanatory screen G3 for a tagged entry word "establish" from a dictionary [ENG-JPN I], i.e., an entry word for which tag data has been set. The entry word explanatory screen G3 shows a blue tag FSb indicating that tag data having a blue color (a type of tag) has been set in association with this entry word, and also shows a blue tag window FSbw exhibiting the set tag data. The blue tag window FSbw has a memo area M where a hand-written memo "テスト" (test) discretionarily input by a user is included.

In one example, the tag FSb and the tag window FSbw each have a memo area M on the left which may be taken as an area for a pasted image, and a type area K on the right which may be taken as an area for a predefined image.

The [History] key 14H in the key input part 14 is to cause the touch panel display part 17 to display, in the form of a search history table screen 65 (as in FIG. 11), a list of entry words for which search was performed in the past.

The [Marker] icon BM in the touch icon area 17A is to designate a desired character string displayed on the touch panel display part 17 and to add a marker (to put a color) on it.

The [Tag] icon BF in the touch icon area 17A is to designate multiple functions for tag data.

FIG. 2 is a block diagram showing an electronic circuitry configuration of the electronic dictionary 10.

The electronic dictionary 10 includes electronic circuitry including a controller 21 which is a computer such as a central processing unit (CPU).

The controller 21 controls operations of each circuitry component according to programs including a dictionary control program 22a already stored in a storage 22 (which may be a flash ROM or the like). The dictionary control program 22a may instead or additionally be read from an external storage medium 23 (which may be a memory card or the like) by a storage medium reader 24 and stored in the storage 22, or downloaded from a web server 30 (intended to be a program server here) on a communication network N by a communication unit 25 and stored in the storage 22.

The controller 21 is connected to the storage 22, the storage medium reader 24, and the communication unit 25, as well as to the key input part 14, the audio outputting part 15, the audio inputting part 16, the touch panel display part 17, etc., via a data/control bus.

The storage 22 includes a program storage region for storing the dictionary control program 22a, as well as a dictionary data storage region 22b, a search history data storage region 22c, a tag setting data storage region 22d, a work data storage region 22e, and so on.

The dictionary control program 22a may be a set of programs including a system program for controlling overall operations of the electronic dictionary 10, a program for establishing connections with external electronic devices via the communication unit 25 for communication, a program for conducting an entry word search using various dictionary data sets stored in the dictionary data storage region 22b, a program for storing a search history for a search target entry word in the search history data storage region 22c, and a program for implementing the tag function for the setting, removal, display, etc. of tag data in association with a search target entry word.

The dictionary data storage region 22b stores various dictionary data sets (dictionary contents) including data from, for example, a Japanese dictionary I, a Japanese dictionary II, an English-Japanese dictionary I, an English-Japanese dictionary II, and a Japanese-English dictionary. Such dictionary data sets (dictionary contents) are the subject of a dictionary search function, which is for searching dictionaries for explanatory information for an entry word corresponding to, for example, a word or a character string input by key operations or designated on a display screen and for outputting the retrieved explanatory information through the display and/or in the form of a sound.

The search history data storage region 22c stores, in association with a search target entry word, information indicating a type, etc. of the dictionary data used in the conducted entry word search (e.g., dictionary names such as "JPN I" and "JPN II").

FIG. 3 is a diagram showing an example of tag setting data (22d) stored in the tag setting data storage region 22d of the electronic dictionary 10.

The tag setting data storage region 22d stores, in association with an entry word for which tag data has been set under the tag function, various information sets including information indicating dictionaries that contain the entry word (e.g., dictionary names), information indicating whether a tag has been set (e.g., "Present" representing the presence (setting) of a tag, and "None" representing the removal (deletion) of a tag), information indicating the number of times the tag setting has been done, information indicating a type (color) of the tag, and information about a memo written in the tag.

The work data storage region 22e stores, as appropriate and on a temporary basis, various data sets including data input by user operations and data acquired or generated by the controller 21 in the course of the controller 21 controlling each circuitry component according to the dictionary control program 22a.

The electronic dictionary 10 having the foregoing configurations realizes functions including the dictionary search function and the tag function as will be described in more detail, through cooperative software and hardware actions in which the controller 21 controls operations of each circuitry component according to the instructions described in the dictionary control program 22a.

Operations in Embodiments

Next, operations of the electronic dictionary 10 according to an embodiment will be described.
<Dictionary Search Process>

Figure 4:
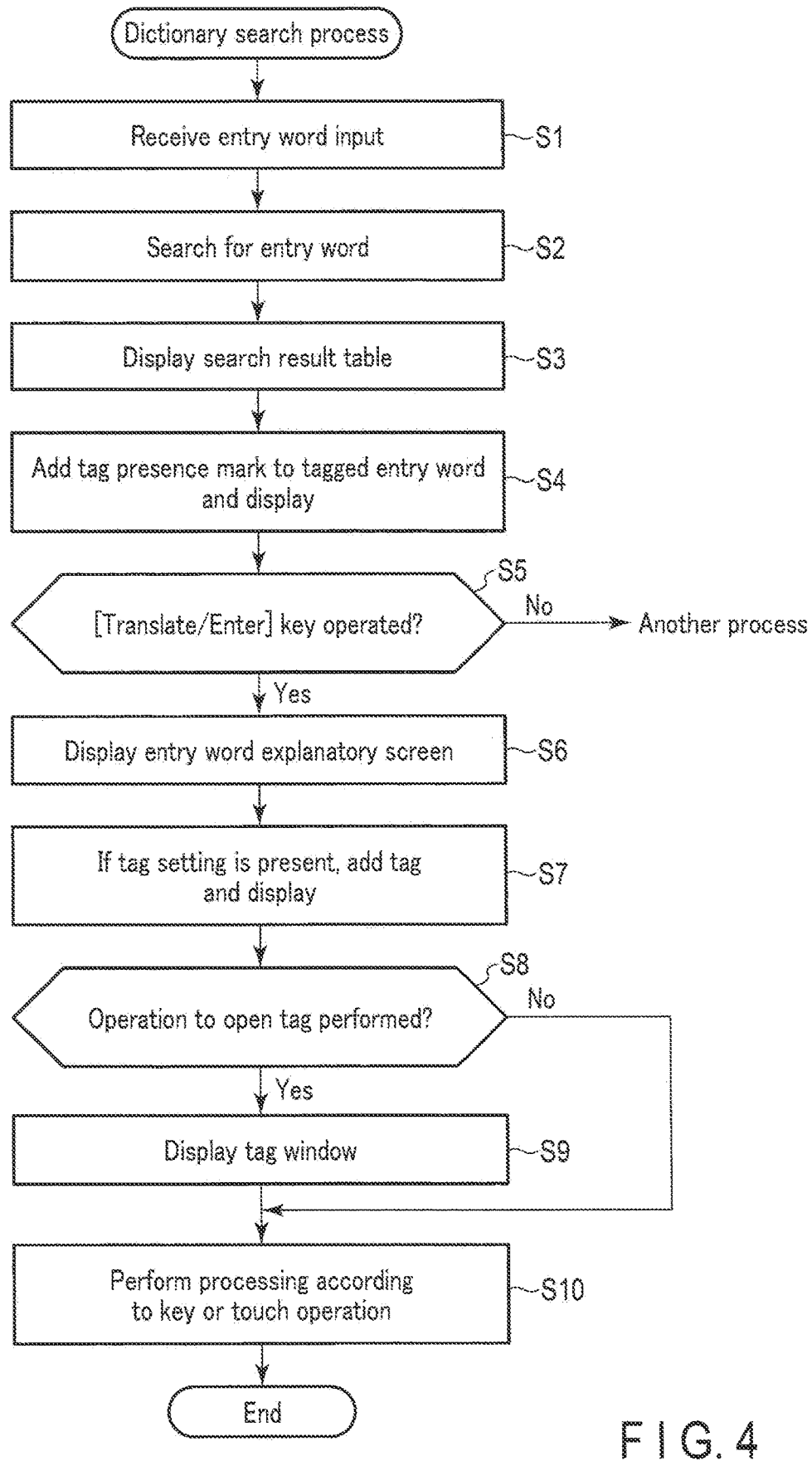
FIG. 4 is a flowchart showing a dictionary search process corresponding to a dictionary search function of the electronic dictionary 10.

FIG. 4 is a flowchart showing a dictionary search process corresponding to the dictionary search function of the electronic dictionary 10.

Figure 5A:
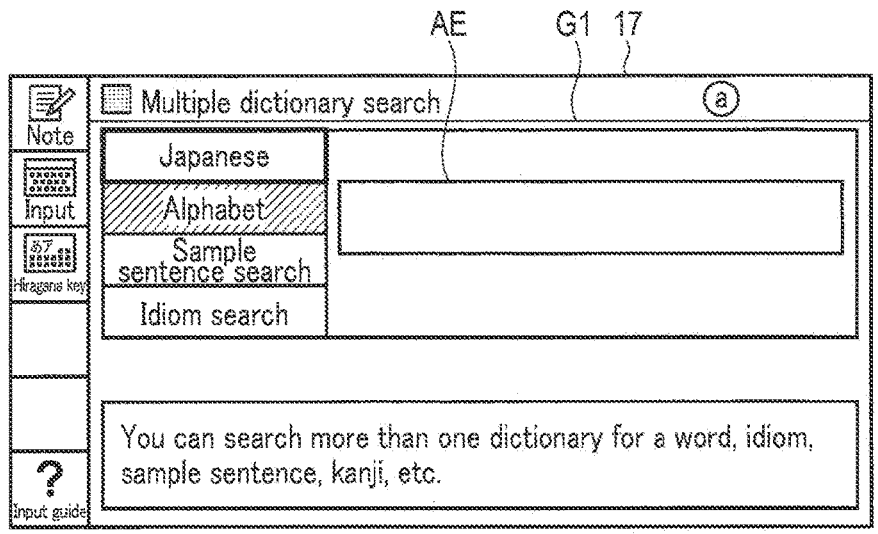
FIG. 5A is a diagram showing a display action of the electronic dictionary 10 according to the dictionary search process.
Figure 5B:
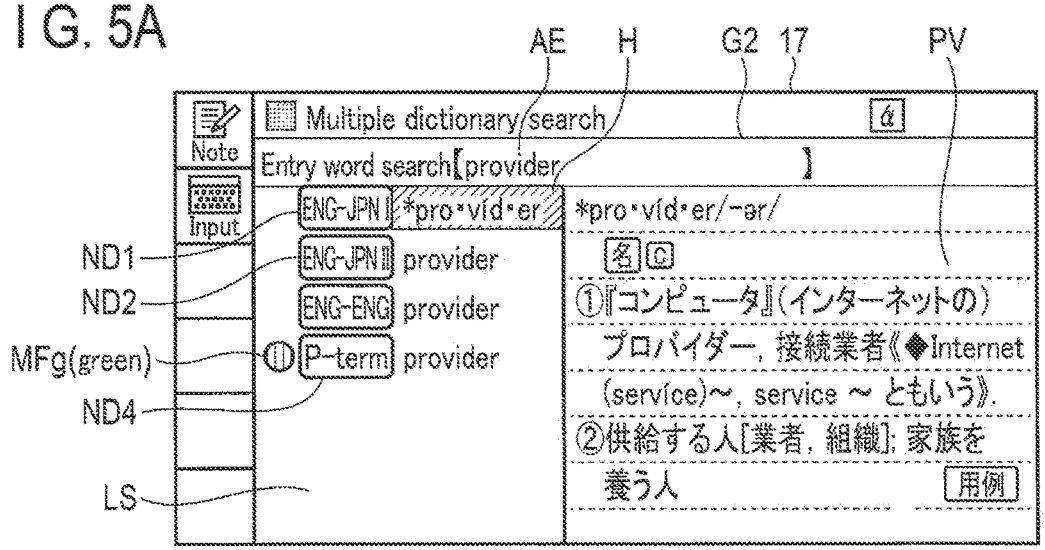
FIG. 5B is a diagram showing a display action of the electronic dictionary 10 according to the dictionary search process.
Figure 5C:
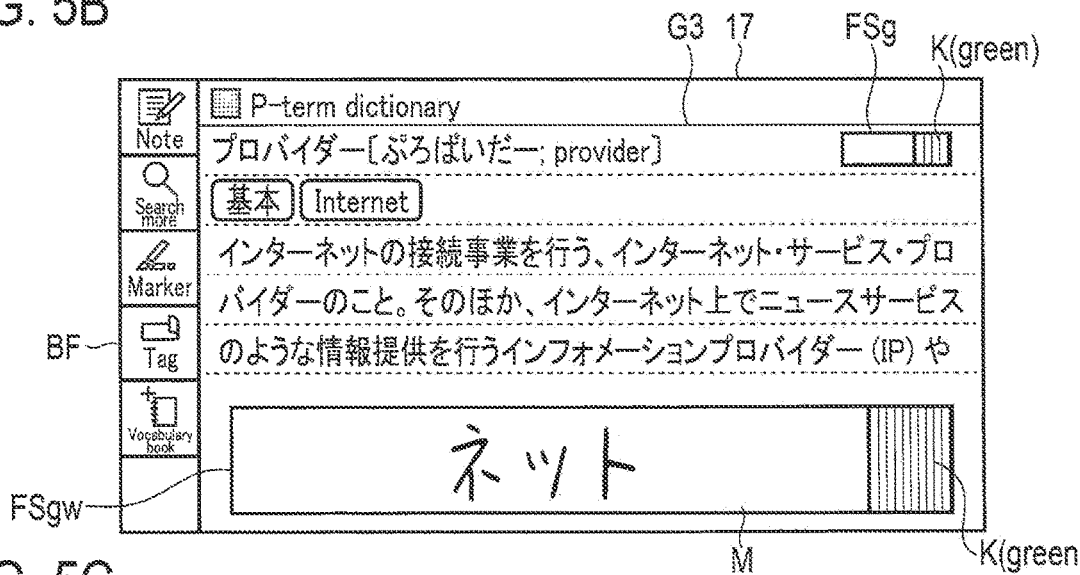
FIG. 5C is a diagram showing a display action of the electronic dictionary 10 according to the dictionary search process.

FIGS. 5A to 5C are diagrams each showing a display action of the electronic dictionary 10 according to the dictionary search process.

As shown in FIG. 5A, for example, in a state where the touch panel display part 17 is displaying an entry word input screen G1, a search target character or character string ("provider" in this example) is input to an entry word input area AE of the entry word input screen G1 according to a user operation. Upon receiving this input (step S1), the controller 21 searches the dictionary data stored in the dictionary data storage region 22b for the entry word corresponding to the character or character string input to the entry word input area AE (step S2).

As shown in FIG. 5B, the controller 21 causes the touch panel display part 17 to display a search result table screen G2 including a list LS in which names ND1, ND2, . . . of the dictionaries used in the search for the entry word "provider" are each associated with this entry word (step S3).

If it is determined based on the tag setting data (22d) that tag data has been set ("Present") for the entry word of any of the dictionaries, the controller 21 causes the list LS in the search result table screen G2 to additionally show a green-colored tag presence mark MFg indicating the type (color) of the tag together with the name of that dictionary (in this example, the name ND4, which is "P-Term") (step S4).

In the search result table screen G2, the dictionary entry word selected from the list LS is distinctively shown with a highlight H or the like, and the highlighted entry word and its explanatory information are displayed in a preview area PV.

With the list LS in the search result table screen G2, the desired dictionary entry word (in this example, the entry word "provider" associated with the dictionary name ND4 ("P-Term")) may be selected and displayed with the highlight H according to, for example, a touch operation or a key operation on the cursor keys 14f. Here, in response to detecting an operation on the [Translate/Enter] key 14d (step S5, Yes), the controller 21 causes the touch panel display part 17 to display the entry word explanatory screen G3 as shown in FIG. 5C, where the selected entry word "provider" of the dictionary "P-Term" is associated with explanatory information for the same entry word (step S6).

If it is determined based on the tag setting data (22d) that tag data has been set ("Present") for the displayed entry word (in this example, the entry word "provider" of the dictionary "P-Term"), the controller 21 causes the entry word explanatory screen G3 to additionally show a green tag FSg having an image of the set tag type (color) (step S7).

Here, if an operation to open the set tag, for example, a touch operation on the tag FSg or on the [Tag] icon BF, is performed (step S8, Yes), the controller 21 causes the entry word explanatory screen G3 to display, along its lower edge, a green tag window FSgw exhibiting the set tag data as shown in FIG. 5C (step S9).

If a different key or touch operation is performed, the controller 21 proceeds with the processing according to such a different operation (step S10).

Note that the tag window for exhibiting data of a tag that is set for a given entry word (in FIG. 5C, the green tag window FSgw) is not limited to such a configuration of displaying on the entry word explanatory screen G3 for the entry word. It is also possible to instead or additionally adopt a configuration of displaying on the preview area PV in the search result table screen G2 for the entry word with the set tag (cf., FIG. 5B, where the tag presence mark MFg is associated with the entry word) according to a given operation to open the set tag.

Note also that, while the dictionary search process discussed above has assumed an instance of searching more than one dictionary without designating a subject dictionary for performing the entry word search, the dictionary search process may involve designation of a specific dictionary or dictionaries. Even in such instances, the dictionary search process is performed in the same manner as discussed above except that the list LS in the search result table screen G2 (cf., FIG. 5B) may omit indications of the dictionary names ND1, ND2, etc.
<Tag Setting Process>

Figure 6:
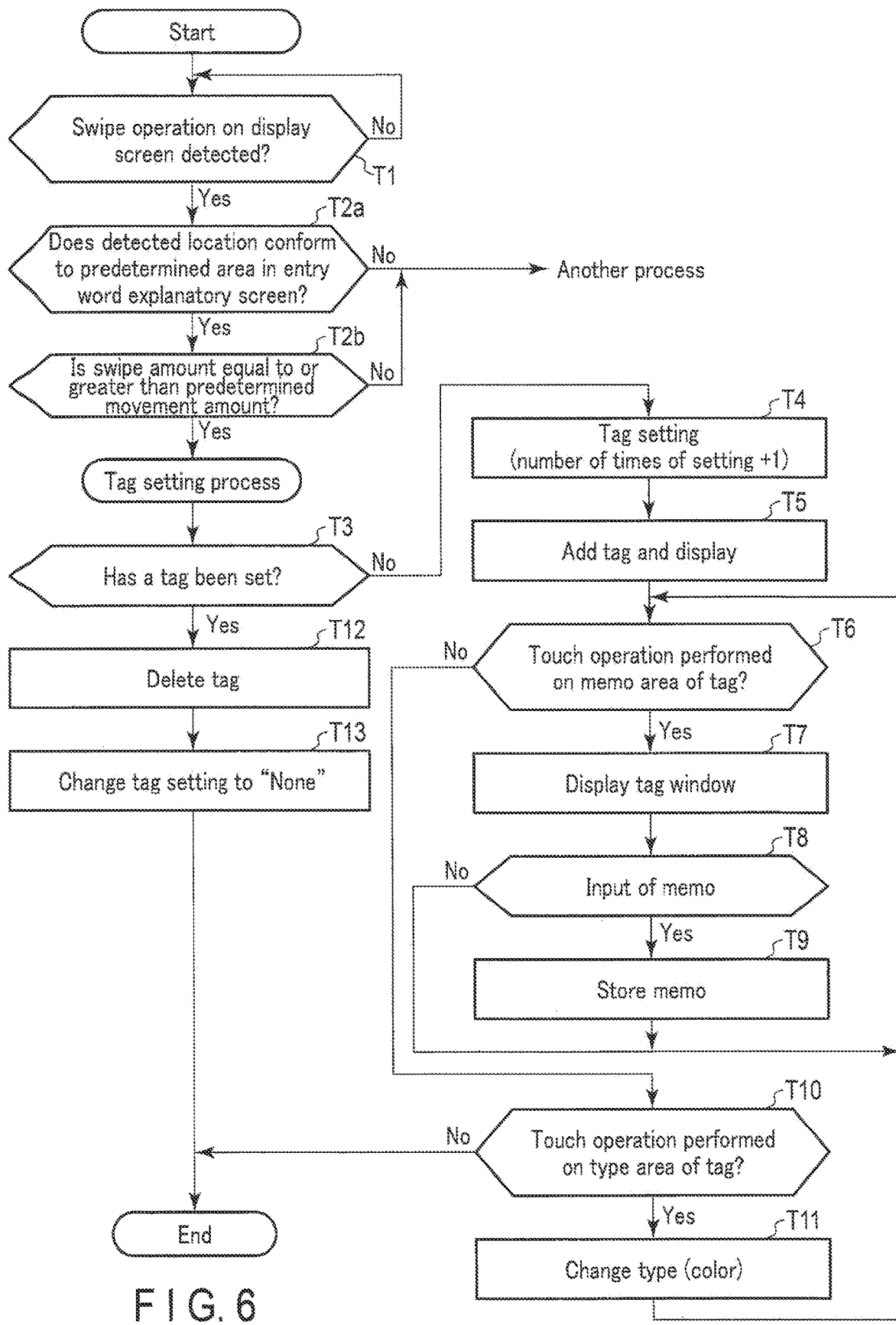
FIG. 6 is a flowchart showing a tag setting process corresponding to a tag function of the electronic dictionary 10.

FIG. 6 is a flowchart showing a tag setting process corresponding to the tag function of the electronic dictionary 10.

Figure 7A:
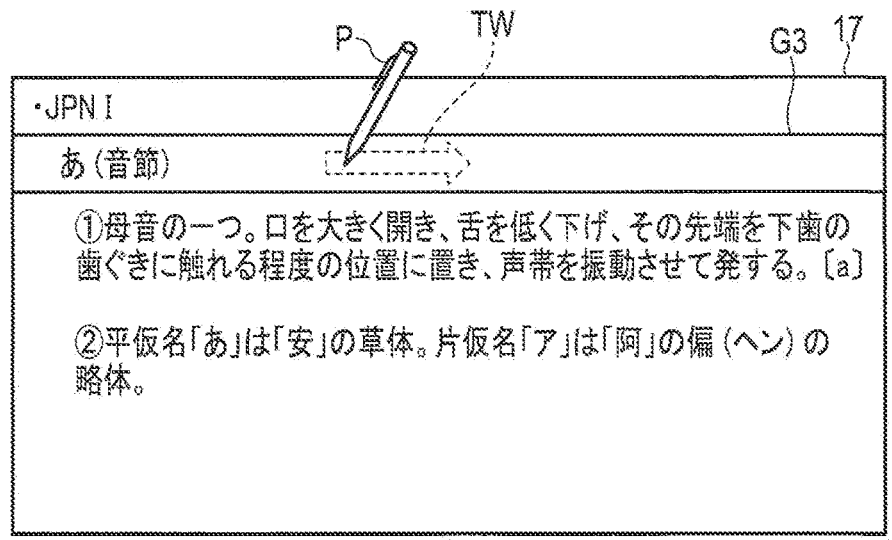
FIG. 7A is a diagram showing a display action of the electronic dictionary 10 that occurs along with the setting of a tag in association with an entry word according to the tag setting process.
Figure 7B:
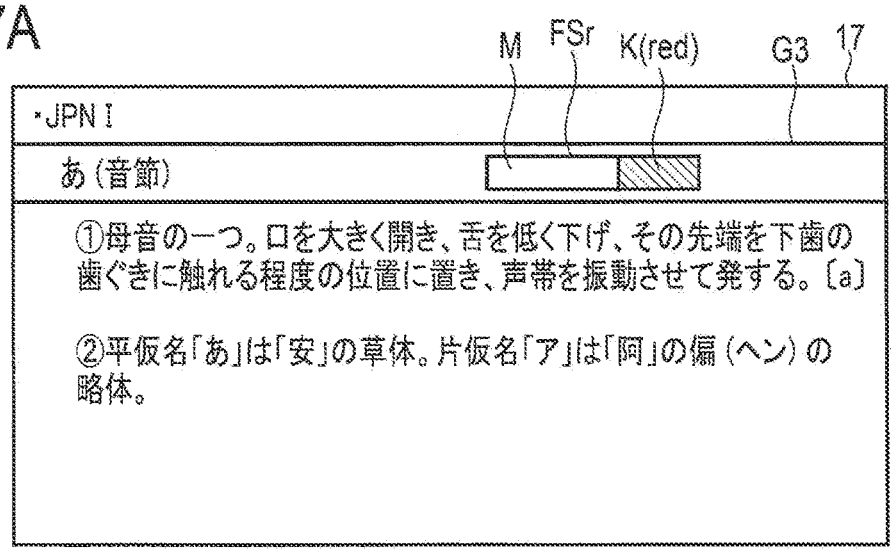
FIG. 7B is a diagram showing a display action of the electronic dictionary 10 that occurs along with the setting of a tag in association with an entry word according to the tag setting process.
Figure 7C:
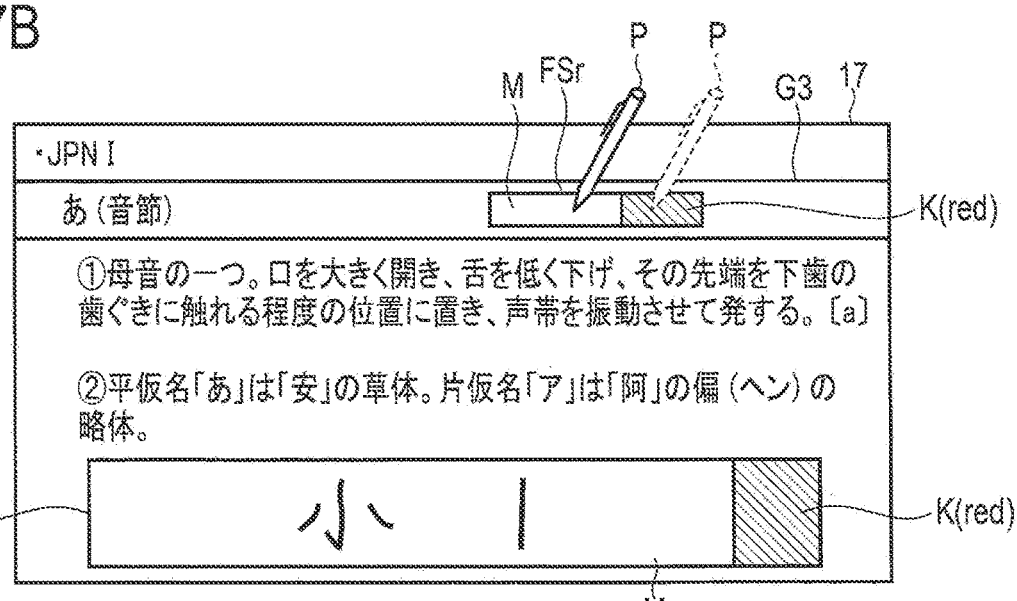
FIG. 7C is a diagram showing a display action of the electronic dictionary 10 that occurs along with the setting of a tag in association with an entry word according to the tag setting process.

FIGS. 7A to 7C are diagrams each showing a display action of the electronic dictionary 10 that occurs along with the setting of a tag in association with an entry word according to the tag setting process.

For example, it will be supposed that the touch panel display part 17 is displaying, as shown in FIG. 7A, the entry word explanatory screen G3 for an entry word (in this example, "あ（音節）" (a Japanese syllable) from the dictionary "JPN I") according to the above-described dictionary search process (cf., FIGS. 4 and 5). If a touch pen P performs a rightward swipe operation TW (a swiping in the direction from the memo area M of a tag, the area for a pasted image, to the type area K of the tag, the area for a predefined image) on a blank space of the entry word explanatory screen G3 (in this example, a blank space in the display line for the entry word "あ（音節）"), the controller 21 detects the swipe operation TW (step T1, Yes) and determines that the detected location of the swipe operation TW falls in a predetermined area (the blank space) of the entry word explanatory screen G3 (step T2a, Yes).

Note that the predetermined area (the blank space) of the entry word explanatory screen G3 here may be a vacant portion in an explanatory information area constituted by the display lines for the entry word and explanatory information, etc.

The controller 21 determines whether or not a swipe amount corresponding to the detected swipe operation is equal to or greater than a predetermined movement amount (step T2b). If it is determined that the swipe amount is equal to or greater than the predetermined amount (step T2b, Yes), the controller 21 proceeds with the tag setting process.

On the other hand, if a swipe operation is detected on a blank space in the screens other than the entry word explanatory screen G3, or if a swipe operation is detected on an information display area in the entry word explanatory screen G3 which is different from the blank space and which is currently displaying text or the like (step T1, Yes & step T2a, No), or if the detected swipe amount on the blank space in the entry word explanatory screen G3 does not reach the predetermined movement amount (step T1, Yes, step T2a, Yes, & step T2b, No), the controller 21 conducts other processes according to the detected swipe operation. That is, the controller 21 determines whether or not the detected location of the swipe operation TW is within the predetermined area (in this example, a given blank space), and if it is determined to be within the predetermined area, the controller 21 conducts the processing of step T2b. If a swipe operation is detected on an area different from the predetermined area intended for the tag setting process (e.g., a given blank space in the entry word explanatory screen G3), the controller 21 forgoes the tag setting process. In one embodiment, step T2b may be omitted. That is, the controller 21 may conduct the tag setting process in response to detecting a swipe operation on the predetermined area intended for the tag setting process (step T2a).

If it is determined that the swipe operation TW of a movement amount equal to or greater than the predetermined movement amount has been performed on the blank space in the entry word explanatory screen G3 as shown in FIG. 7A (step T2b, Yes), the controller 21 proceeds with the tag setting process, where it determines, based on the tag setting data (22d), whether or not there is any tag data already set in association with the entry word shown in this entry word explanatory screen G3 (step T3).

Here, the state in which tag data has already been set corresponds to the condition where the tag setting data (22d) stores the entry word shown in the entry word explanatory screen G3 and includes "Present" as the information indicating the presence or absence of a set tag. Also, the state in which no tag data is currently set corresponds to the condition where the tag setting data (22d) does not store the entry word shown in the entry word explanatory screen G3, or even if the tag setting data (22d) stores the entry word, its information indicating the presence or absence of a set tag shows "None".

If it is determined in step T3 that there is no tag data already set in association with the entry word (in this example, "あ（音節）" from the dictionary "JPN I") shown in the entry word explanatory screen G3 on which the swipe operation has been performed (step T3, No), the controller 21 stores the information "Present" in the tag setting data (22d) in association with the entry word ("あ（音節）" from the dictionary "JPN I"), and also increments the information indicating the number of times of tag setting by one in the tag setting data (22d). The information stored for indicating a type (color) of the set tag may be, for example, "Red" by default (step T4).

In one example, the information indicating the number of times of tag setting is "1" if a tag is set (added) for a given dictionary entry word for the first time ever, and it is "2" if such a tag setting is canceled (removed) and then a tag is set (added) afresh.

The controller 21 causes the entry word explanatory screen G3 to additionally show a red tag FSr having an image of, for example, a sticky note according to the set type (by default, red), in the blank space in the entry word explanatory screen G3 where the swipe operation TW has been received and along the movement direction of the swipe operation TW (the direction from the memo area M or the area for a pasted image to the type area K or the area for a predefined image of the tag), as shown in FIG. 7B (step T5).

Note that the blank space for displaying the tag in the entry word explanatory screen G3 is not limited to a specific blank space where a swipe operation has been received. The blank space for displaying the tag may be any blank spaces in the screen, such as a predetermined blank space or the largest blank space among multiple blank spaces.

Here, as shown in FIG. 7C, if a touch operation is performed by the touch pen P on the memo area M of the tag FSr displayed on the entry word explanatory screen G3 (step T6, Yes), the controller 21 causes the entry word explanatory screen G3 to display, along its lower edge, a red tag window FSrw exhibiting the tag data set in step T4 (step T7).

Then, if a hand-written memo is input by the touch pen P in the memo area M of the displayed tag window FSrw (step T8, Yes), the controller 21 stores the input memo data in the tag setting data storage region 22d in association with the corresponding tag data (in this example, the entry word "あ（音節）" from the dictionary "JPN I") (step T9).

If, as shown in FIG. 7C, a touch operation is performed by the touch pen P on the type area K (the red area) of the tag FSr displayed on the entry word explanatory screen G3 (step T10, Yes), the controller 21 changes the type (color) data of the corresponding tag each time a touch is made and in the order of, for example, red →yellow →aqua →green →blue →red, and so on. The controller 21 causes the screen to show the type (color) after the change and updates the type (color) information in the tag setting data (22d) (step T11).

Note that, in the case where the entry word explanatory screen G3 is showing a tag window FSrw according to step 17, the corresponding tag type (color) data may be changed in the same manner as above, each time the type (color) area K of this tag window FSrw is touched. The type (color) of a tag may also be changed based on the movement amount of a swipe operation TW that is performed on the blank space in the entry word explanatory screen G3 while the type (color) of the displayed tag (the tag SFr in FIGS. 7B and 7C) is continuously changed. Changes of the tag type (color) may instead or additionally be based on the location of the swipe operation (e.g., a given line in the entry word explanatory screen G3), the number of times of tag setting, the selection from the menu data for tag types (colors), and so on.

In one example, if the movement amount of the swipe operation TW is smaller than a predetermined first threshold, the tag color may be set to a first color (e.g., red), and if the movement amount of the swipe operation TW is equal to or greater than the first threshold and smaller than a predetermined second threshold, the tag color may be set to a second color (e.g., yellow). Similarly, assuming that a relationship of an n-th threshold <an (n+1)th threshold (n being a natural number) is true, it is also possible to set the tag color to the (n+1)th color (e.g., green) if the movement amount of the swipe operation TW is equal to or greater than the n-th threshold and smaller than the (n+1) th threshold. As a further alternative or additional option, it is possible to set the tag color to the first color (e.g., ref) if the location of the swipe operation conforms to a line directly below the first explanatory note (explanatory information) in the entry word explanatory screen G3, to set the tag color to the second color (e.g., yellow) if the location of the swipe operation conforms to a line directly below the lowermost explanatory note in the entry word explanatory screen G3, and to set the tag color to the n-th color (e.g., blue) if the location of the swipe operation conforms to a line directly below the n-th explanatory note from the bottom in the entry word explanatory screen G3.

Figure 8A:
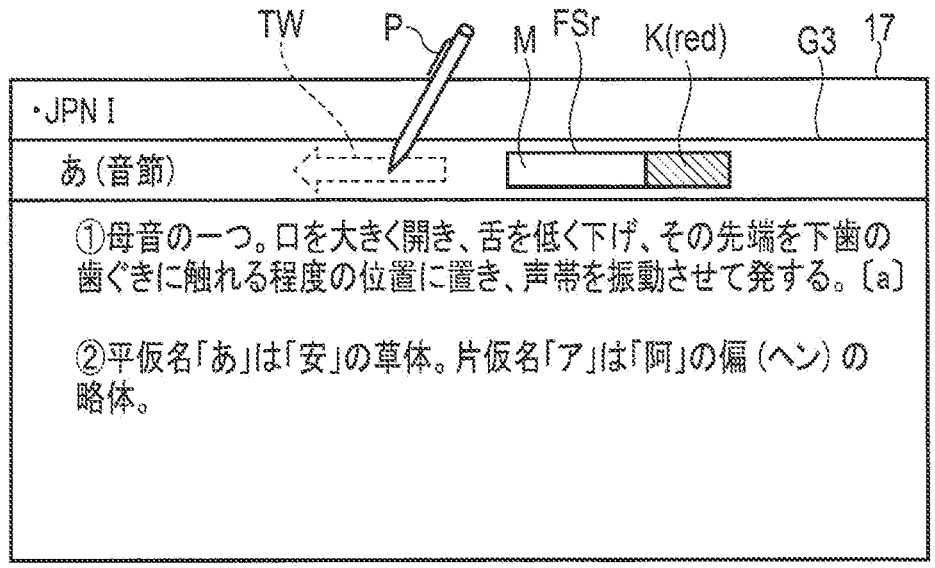
FIG. 8A is a diagram showing a display action of the electronic dictionary 10 that occurs along with the removal of a tag according to the tag setting process.
Figure 8B:
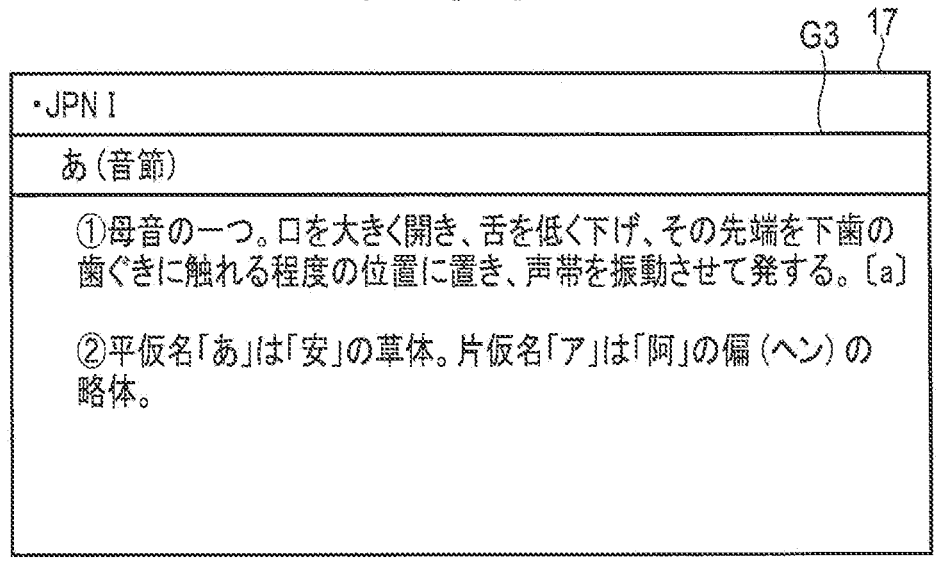
FIG. 8B is a diagram showing a display action of the electronic dictionary 10 that occurs along with the removal of a tag according to the tag setting process.

FIGS. 8A and 8Ba are diagrams each showing a display action of the electronic dictionary 10 that occurs along with the removal of a tag according to the tag setting process.

For example, it will be supposed that the touch panel display part 17 is displaying, as shown in FIG. 8A, the entry word explanatory screen G3 for an entry word for which tag data has been set (in this example, the entry word "あ（音節）" from the dictionary "JPN I"), according to the above-described dictionary search process (cf., FIGS. 4 and 5). If a leftward swipe operation TW (a swiping in the direction from the type area K of the tag, the area for a predefined image, to the memo area M of the tag, the area for a pasted image) by the touch pen P with a movement amount equal to or greater than a predetermined movement amount is received on the blank space of the entry word explanatory screen G3 (in this example, a blank space in the display line for the entry word "あ（音節）", where the tag FSr is shown) (step T1, Yes, step 12a, Yes, & step T2b, Yes), the controller 21 proceeds with the tag setting process.

The controller 21 determines, based on the tag setting data (22d), whether or not there is any tag data already set in association with the entry word ("あ（音節）" from the dictionary "JPN I") shown in this entry word explanatory screen G3 (step T3).

If it is determined that there is tag data already set in association with the entry word ("あ（音節）" from the dictionary "JPN I") shown in the entry word explanatory screen G3 (step T3, Yes), the controller 21 deletes the tag FSr from the entry word explanatory screen G3 as shown in FIG. 8B (step T12) and changes the corresponding tag setting information in the tag setting data (22d) which is associated with the entry word ("あ（音節）" from the dictionary "JPN I") to "None" (step T13). Here, if the tag data is already set in association with the entry word, the blank space may overlap the tag FSr. That is, the controller 21 may also delete the tag FSR in response to a swipe operation TW on the tag FSr.

Note that the above-described tag setting process including tag setting and tag removal has been assumed to be a process conducted with the entry word explanatory screen G3. However, it is also possible to instead or additionally adopt a configuration where a similar tag setting process can be conducted with the search result table screen G2 (cf., FIG. 5B) including the preview area PV for displaying explanatory information for an entry word (with a highlight H) selected from the list LS.

<Tag display Process>

Figure 9:
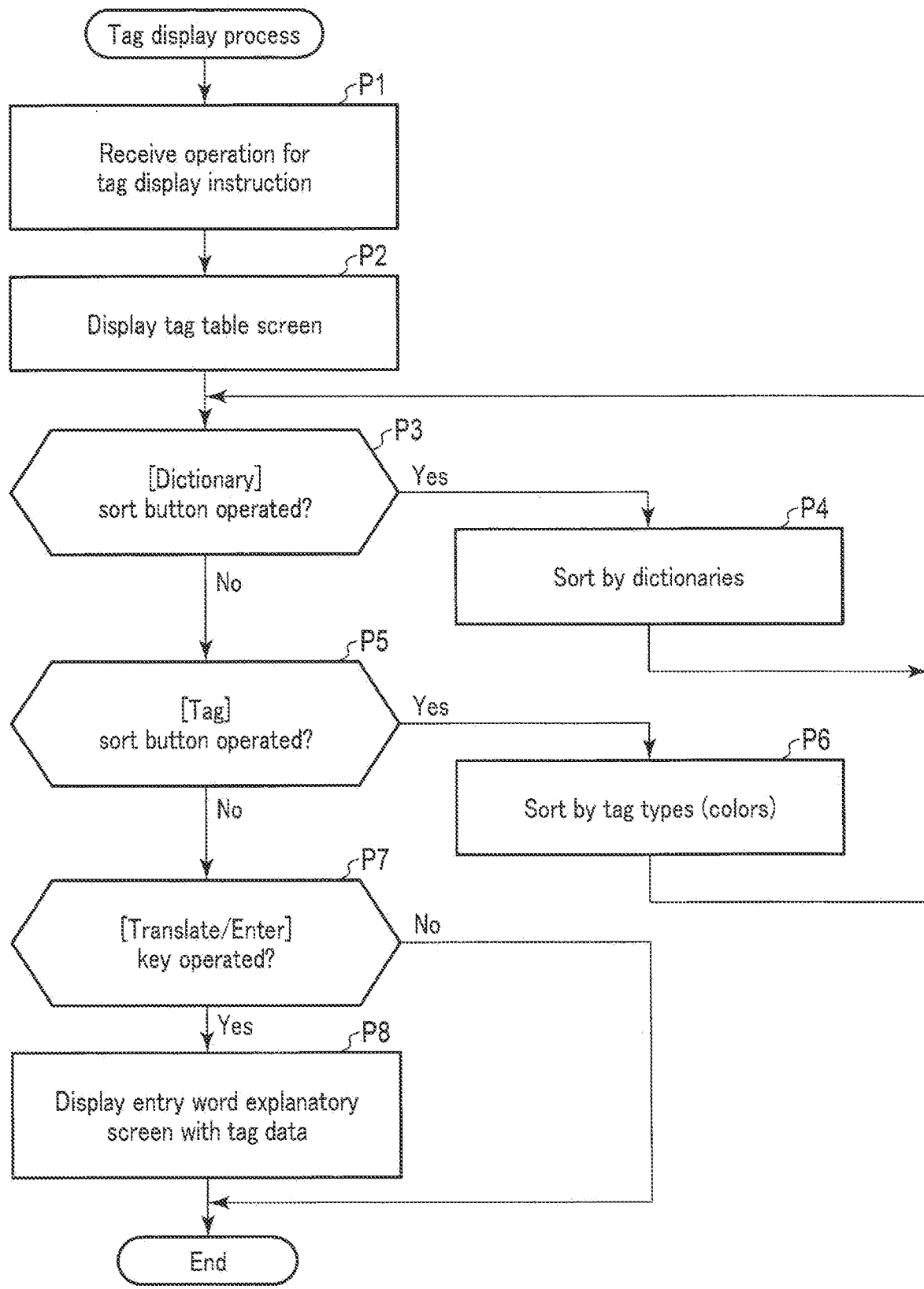
FIG. 9 is a flowchart showing a tag display process corresponding to the tag function of the electronic dictionary 10.

FIG. 9 is a flowchart showing a tag display process corresponding to the tag function of the electronic dictionary 10.

Figure 10A:
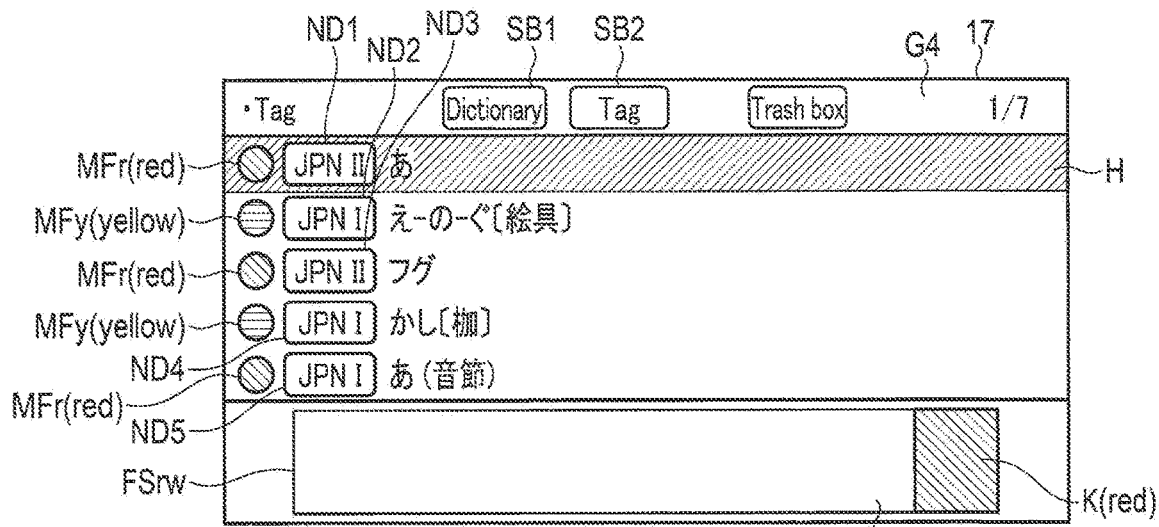
FIG. 10A is a diagram showing a display action of the electronic dictionary 10 for a tag table screen G4 according to the tag display process.
Figure 10B:
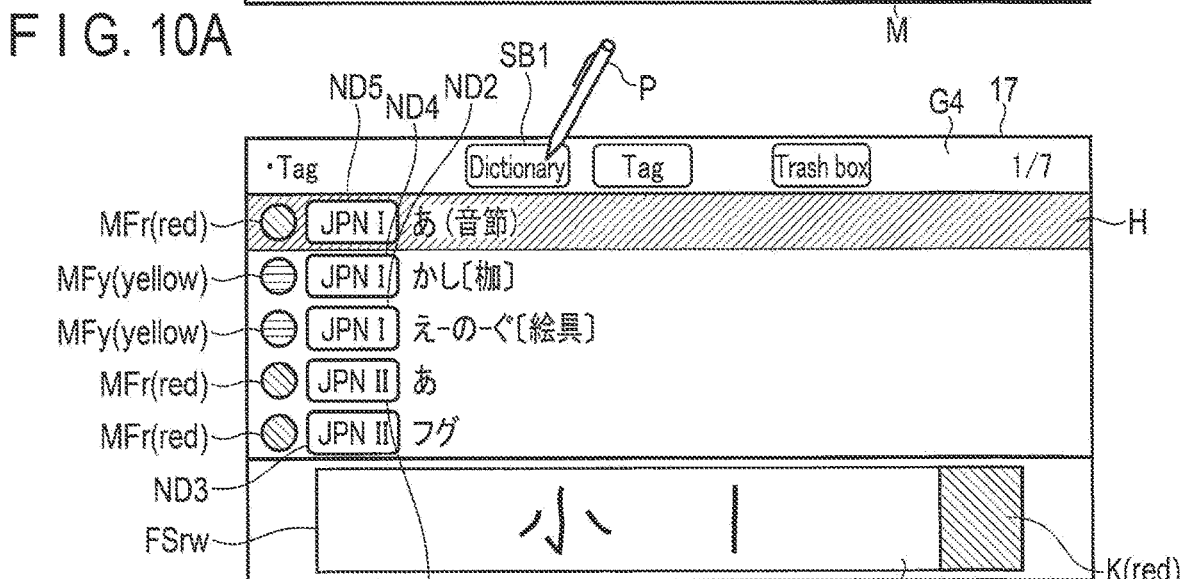
FIG. 10B is a diagram showing a display action of the electronic dictionary 10 for the tag table screen G4 according to the tag display process.
Figure 10C:
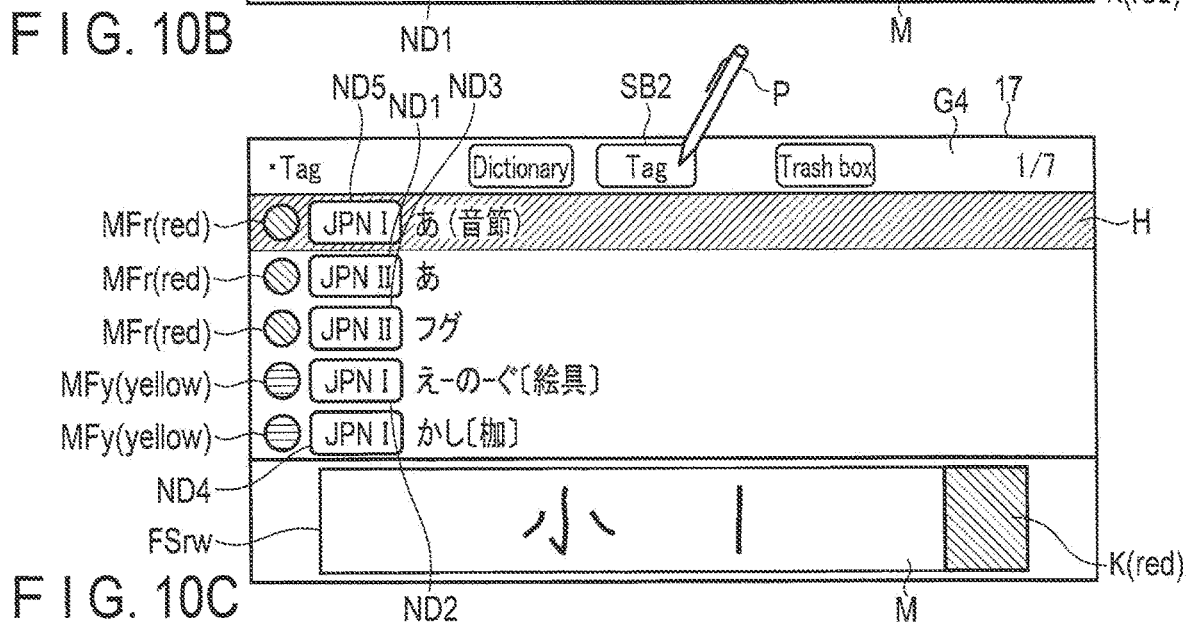
FIG. 10C is a diagram showing a display action of the electronic dictionary 10 for the tag table screen G4 according to the tag display process.

FIGS. 10A to 10C are diagrams each showing a display action of the electronic dictionary 10 for the tag table screen G4 according to the tag display process.

It will be supposed that an operation for instructing display of a tag is received through, for example, a touch operation on the [Tag] icon BF, or a selection of an item [Tag] from the menu items of a workbook displayed according to a key operation of the [Workbook] function designation key 14b (step P1). In response to this, the controller 21 causes the touch panel display part 17 to display, based on the tag setting data (22d), the tag table screen G4 listing the dictionary entry words associated with the tag setting information "Present" in chronological order of storage (in the order of tag setting) as shown in FIG. 10A (step P2).

The tag table screen G4 shows, in the form of a list, the entry words having the tag setting information "Present" (in this example, "あ" (a), "えのぐ" (paint), "フグ" (puffer fish), etc.) in association with the respective tag presence marks (MFr, MFy, MFr, . . . ) indicating the tag types (colors) and the respective dictionary names (name ND1 "JPN II", name ND2 "JPN I", name ND3 "JPN II", . . . ).

In the tag table screen G4, the entry word selected from the list (by default, the first listed entry word) is distinctively shown with a highlight H or the like, and the tag window set for the highlighted entry word (in this example, a red tag window FSrw) is shown along the lower edge of the tag table screen G4.

Here, if a [Dictionary] sort button SB1 provided along the upper edge of the tag table screen G4 receives a touch operation (a second operation) (step P3, Yes), the controller 21 sorts the listed entry words by their source dictionaries and causes the sort result to be displayed as shown in FIG. 10B (step P4).

Also, if a [Tag] sort button SB2 provided along the upper edge of the tag table screen G4 receives a touch operation (a first operation) (step P5, Yes), the controller 21 sorts the listed entry words by their set tag types (colors) and causes the sort result to be displayed as shown in FIG. 10C (step P6).

In the tag table screen G4, the desired dictionary entry word for which a tag is set (in this example, the entry word "あ（音節）" associated with the red tag presence mark MFr and the dictionary name ND5 "JPN I") is selected and displayed with a highlight H according to, for example, a touch operation or a key operation on the cursor keys 14f. Here, in response to detecting an operation on the [Translate/Enter] key 14d (step P7, Yes), the controller 21 causes the touch panel display part 17 to display the entry word explanatory screen G3, where the data of the corresponding tag is exhibited as shown in FIG. 5C (step P8).

Note that the above-described tag display process including the tag type (color)-based sorting of entry words with tags, performed according to an operation to the [Tag] sort button SB2, has been assumed to be a process conducted with the tag table screen G4. However, it is also possible to instead or additionally adopt a configuration where a similar tag display process can be conducted with the search result table screen G2 (cf., FIG. 5B) on which the entry words are shown with tag presence marks in the list LS.

Also, it has been assumed for the above-described tag display process that the tag table screen G4 presents the list of entry words each having the tag setting information "Present" in the tag setting data (22d), i.e., entry words for which respective tags are set. However, the tag table screen G4 may distinctively present the list of entry words each having the tag setting information "None", i.e., entry words for which tag data has been removed (entry words with tag data in the past). Then, the dictionary-based sorting or the tag type (color)-based sorting of the listed entry words may be conducted in the same manner as described above.

<Search History Display Process>

Figure 11:
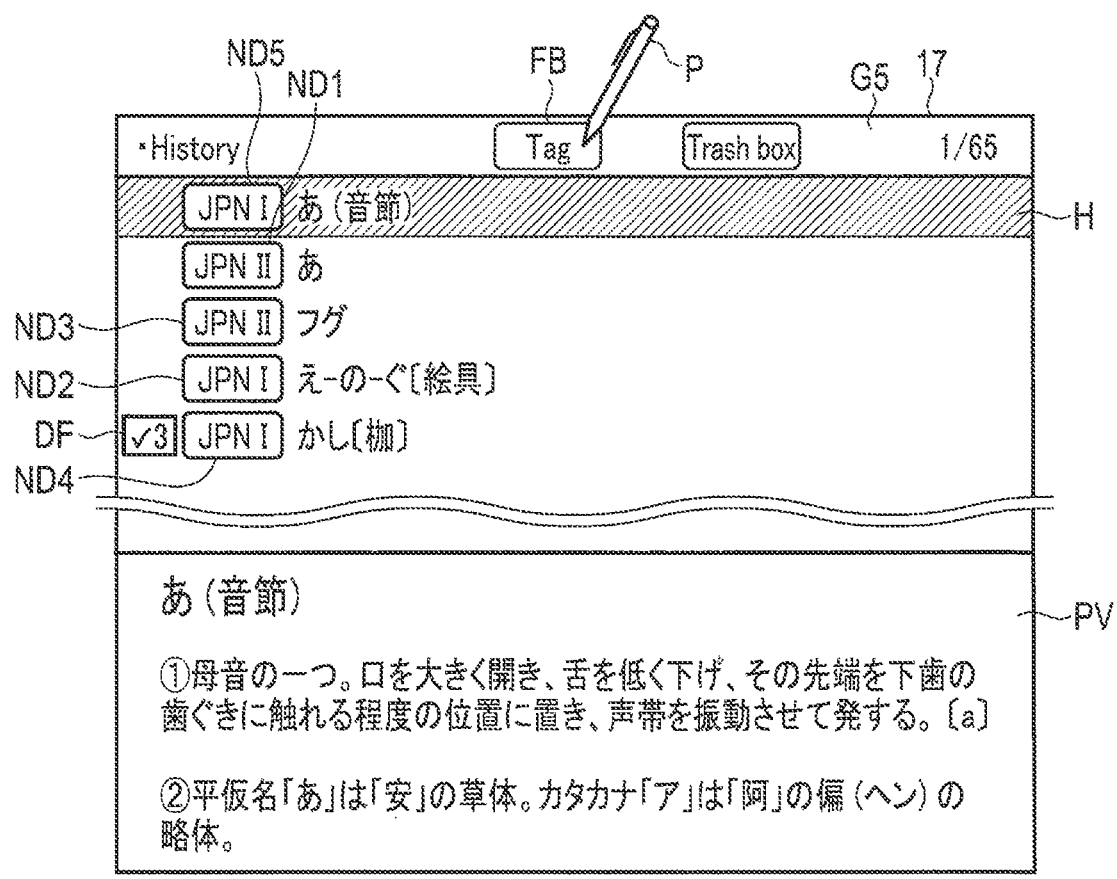
FIG. 11 is a diagram showing a display action of the electronic dictionary 10 for a search history table screen G5 according to a search history display process.

FIG. 11 is a diagram showing a display action of the electronic dictionary 10 for the search history table screen G5 according to a search history display process.

It will be supposed that an operation for instructing display of entry words used in the past search is performed through, for example, a key operation of the [History] key 14H. Upon receiving such an operation, the controller 21 causes the touch panel display part 17 to display the search history table screen G5 showing a list of dictionary entry words stored in the search history data storage region 22c, as shown in FIG. 11.

In this state, if a touch operation on a [Tag] button FB provided along the upper edge of the search history table screen G5 is detected, the controller 21 specifies, among the listed entry words, if any, an entry word for which tag data has been set (added) and deleted (removed) in the past (in this example, an entry word "かし [樫]" from the dictionary "JPN I"), based on the tag setting information "None" in the tag setting data (22d).

The controller 21 then adds an indication of the number of times "3" of tag setting, recorded in the tag setting data (22d), to this entry word (i.e., "かし [樫]" from the dictionary "JPN I") as a tag add-and-remove number DF, and causes it to be displayed as shown in FIG. 11.

The user is thus enabled to see the entry word along with the tag add-and-remove number DF among the entry words in the search history, so that the user can recall, for example, words that have been important for the user or words that were difficult to remember, and can consequently promote the word learning activities.

In the search history table screen 65, the dictionary entry word selected from the list may be distinctively shown in a highlight H or the like, and the highlighted entry word and its explanatory information are displayed in a preview area PV for check.

Summary of Embodiments

With the electronic dictionary 10 according to an embodiment, if a swipe operation TW is performed on a blank space (a predetermined area) of a screen (the entry word explanatory screen G3, the preview area PV in the search result table screen G2, etc.) that is showing a desired entry word, and if it is determined that no tag is currently set in association with this entry word, tag data is set in the tag setting data (22d) in association with this entry word (i.e., the tag setting information is turned to "Present") and a tag PSr of the set tag type (e.g., red) is additionally displayed on the blank space of the screen.

If a touch operation is performed on the memo area M of the tag FSr, a tag window FSrw exhibiting the corresponding tag data from the tag setting data (22d) is displayed. Then, if a hand-written memo is input to the memo area M of this tag window FSrw, the input memo data is stored in the tag setting data (22d) in association with the corresponding entry word.

The type (color) area K of the tag FSr or that of the tag window FSrw changes its displayed type (color) each time it receives a touch operation, and the type (color) after the change is stored in the tag setting data (22d) in association with the corresponding entry word.

On the other hand, if a tag has already been set in association with the displayed desired entry word (in the case where the screen shows a tag FSr), the tag setting information in the tag setting data (22d), stored in association with this entry word, is changed to "None" along with the deletion of the tag FSr in response to a swipe operation TW on the blank space of the screen.

The above configuration allows the user to set a tag with a desired type (color) and also delete the set tag in association with an entry word desired by the user through very simple swipe operations. Therefore, a prominently improved operability in adding and removing tags for desired entry words can be realized.

Also, with the electronic dictionary 10 according to an embodiment, if the [Dictionary] sort button SB1 is operated (a second operation is performed) in the tag table screen G4 that is showing a list of entry words each having the tag setting information "Present" based on the tag setting data (22d), the listed entry words are sorted by source dictionaries and the sort result is displayed. If the [Tab] sort button SB2 is operated (a first operation is performed) in the screen, the listed entry words are sorted by tag types (colors) and the sort result is displayed. Then, in response to the selection (distinctive display with a highlight H) of a tagged entry word of the desired dictionary (e.g., with the dictionary name ND1) or a tagged entry word of the desired tag type (e.g., with a red tag presence mark MFr), and a subsequent operation of the [Translate/Enter] key 14d, the entry word explanatory screen G3 showing the corresponding tag data is displayed.

This configuration accordingly allows for the easy spotting of a desired tagged entry word for which a tag has been set (added), so that the explanatory information for the entry word and the memo of the corresponding tag can be obtained. Therefore, a prominently improved operability can also be realized for the checking of tagged entry words.

For the foregoing embodiments, the description has assumed a configuration where a rightward swipe operation TW (a swiping in the direction from the memo area M of a tag, the area for a pasted image, to the type area K of the tag, the area for a predefined image) on a predetermined area (a given blank space) in the entry word explanatory screen G3 triggers the tag setting process of turning the tag setting data to "Present" and displaying a tag FSr. Also, a leftward swipe operation TW (a swiping in the direction from the type area K of the tag, the area for a predefined image, to the memo area M of the tag, the area 10 for a pasted image) on the predetermined area triggers the tag setting process of turning the tag setting data to "None" and deleting the tag FSr. However, the embodiments are not limited to such a configuration. It is also possible to adopt a configuration where once a swipe operation TW is detected and the tag setting process is initiated, the tag setting data, if it is currently "None", is changed to "Present" and the tag FSr is displayed irrespective of the direction of the performed swipe operation TW. Likewise, in this configuration, the tag setting data, if it is currently "Present", is changed to "None" and the tag FSr is deleted irrespective of the direction of the performed swipe operation TW.

Various functions of the electronic dictionary 10 according to the foregoing embodiments, such as the dictionary search function, the tag function, and the search history storage and display functions, may be provided in the form of web apps within the web server 30 (or a dictionary server) on the communication network N. In this way, an electronic device, for example, a tablet terminal or a PDA that can communicate with the web server 30, can operate in the same manner as discussed for the above embodiments as an input/output terminal for use by the user.

Processes intended for implementation by the electronic dictionary 10 as described for the foregoing embodiments, namely, the tag setting process shown in the flowchart of FIG. 6, the tag display process shown in the flowchart of FIG. 9, the search history display process discussed with reference to FIG. 11, and so on, may each or in combination be stored and distributed in the form of a computer-executable program in an external storage medium such as a memory card (a ROM card, a RAM card, etc.), a magnetic disk (a Floppy™ M disk, a hard disk, etc.), an optical disk (a CD-ROM, a DVD, etc.), or a semiconductor memory. A controller (a CPU) in an electronic device may load this program stored in the external storage medium into the its storage unit and control the device operations according to the program, so that the various functions as discussed for each embodiment will be realized and the corresponding processes are performed.

The program data for realizing each process may also be transmitted on the communication network N in the form of program codes. The program data may be provided from a computer device (program server) connected to the communication network N and incorporated into the storage unit of an individual electronic device, so that the various functions discussed above are realized and the corresponding processes are performed.

The disclosure herein is not limited to the foregoing embodiments. For practical implementation, various modifications may be adopted without departing from its gist. The various embodiments may be discretionarily combined for implementation, and such combinations will produce combined effects. Moreover, the embodiments involve various aspects, and appropriate combinations of the disclosed features will permit various inventions to be derived. For example, if omission of several features from the entire configuration or structure disclosed for the embodiments can realize the intended object and provide the effects, the configuration or structure after such omission may be derived.

What is claimed is:

1. An electronic device comprising:
a display;
a touch panel configured to detect a user operation; and
a controller configured to conduct, based on a predetermined operation performed on the touch panel by a user while an entry word is displayed on the display, a tag setting process for a tag associated with the entry word,
wherein the tag setting process comprises a process for setting tag data in association with the entry word, and
the controller is configured to
search multiple dictionary data sets for a plurality of entry words corresponding to characters input by the user, and
cause the display to display a list of the entry words for which search has been conducted, wherein a mark indicative of a tag type is added for, among the entry words in the list, an entry word for which the tag data is set.

2. The electronic device according claim 1, wherein the predetermined operation comprises a predetermined operation performed on a predetermined area of the touch panel, and wherein the predetermined area is a blank space in an explanatory information area for displaying explanatory information for the entry word.

3. The electronic device according claim 1, wherein the tag setting process comprises a process for displaying a tag on a predetermined area of the touch panel where the predetermined operation is performed or a process for deleting the tag displayed on the predetermined area.

4. The electronic device according claim 1, wherein the controller is configured to cause the tag to be displayed on a location where the predetermined operation has been performed.

5. The electronic device according claim 1,
wherein the predetermined operation comprises a swipe operation having a predetermined movement amount, and
wherein the controller is configured to conduct the tag setting process based on detection of the swipe operation having the predetermined movement amount.

6. The electronic device according claim 1,
wherein the predetermined operation comprises a swipe operation performed on a predetermined area of the touch panel, and
wherein the controller is configured to cause the tag to be displayed on the predetermined area along a direction of the swipe operation.

7. The electronic device according claim 1, wherein:
the predetermined operation comprises a swipe operation,
the tag comprises a pasted-image area and a predefined-image area, and
the controller is configured to
cause the display to display the tag in the case where the swipe operation is received in a direction from the pasted-image area to the predefined-image area while no tag is displayed on the display, and
cause the display to delete the tag in the case where the swipe operation is received in a direction from the predefined-image area to the pasted-image area while the tag is displayed on the display.

8. The electronic device according claim 3, wherein the controller is configured to change a type of the tag and cause the changed type of the tag to be displayed on an area for indicating a tag type, according to a designating operation for the tag.

9. The electronic device according claim 3, wherein:
the predetermined operation comprises a swipe operation, and
the controller is configured to change a type of the tag and cause the changed type of the tag to be displayed on an area for indicating a tag type, according to a movement amount of the swipe operation.

10. The electronic device according claim 3, wherein:
the predetermined operation comprises a swipe operation, and
the controller is configured to change a type of the tag and cause the changed type of the tag to be displayed on an area for indicating a tag type, according to a location where the swipe operation has been performed.

11. The electronic device according claim 1, wherein the controller is configured to
cause the display to display a list of entry words for each of which the tag data is set, in association with a mark indicative of a tag type for each of the entry words in the list, and in response to a first operation for the display while the list of the entry words, for each of which the tag data is set, is displayed, sort the entry words in the list by the tag type and cause the display to display the sorted entry words.

12. The electronic device according claim 1, wherein the controller is configured to, in response to a first operation for the display while the list of the entry words is displayed, sort the entry words in the list by the tag type and cause the display to display the sorted entry words.

13. A control method performed by an electronic device comprising a display and a touch panel, the control method comprising:
   conducting, based on a predetermined operation performed on the touch panel by a user while an entry word is displayed on the display, a tag setting process for a tag associated with the entry word, wherein the tag setting process comprises a process for setting tag data in association with the entry word;
   searching multiple dictionary data sets for a plurality of entry words corresponding to characters input by the user; and
   causing the display to display a list of the entry words for which search has been conducted, wherein a mark indicative of a tag type is added for, among the entry words in the list, an entry word for which the tag data is set.

14. A non-transitory storage medium storing a program executable by a computer of an electronic device comprising a display and a touch panel, the program being executable by the computer to cause the computer to
   conduct, based on a predetermined operation performed on the touch panel by a user while an entry word is displayed on the display, a tag setting process for a tag associated with the entry word, wherein the tag setting process comprises a process for setting tag data in association with the entry word;
   search multiple dictionary data sets for a plurality of entry words corresponding to characters input by the user; and
   cause the display to display a list of the entry words for which search has been conducted, wherein a mark indicative of a tag type is added for, among the entry words in the list, an entry word for which the tag data is set.

15. An electronic device comprising:
a display;
a touch panel configured to detect a user operation; and
a controller,
wherein the controller is configured to
   determine, in response to detecting a swipe operation while an entry word is displayed on the display, whether or not a detected location of the swipe operation is within a predetermined area of the touch panel,
   in a case where the detected location is determined to be within the predetermined area, accept the swipe operation as an operation for conducting a tag setting process for a tag associated with the entry word, and
   perform, as the tag setting process:
      a process of setting the tag in association with the entry word and incrementing a number of times of tag setting including tag addition and tag removal, if the tag is not set in association with the entry word at detection of the swipe operation, and
      a process of deleting the tag set in association with the entry word, if the tag is already set in association with the entry word at detection of the swipe operation.

* * * * *

UNITED STATES PATENT AND TRADEMARK OFFICE
CERTIFICATE OF CORRECTION

PATENT NO. : 12,340,072 B2  
APPLICATION NO. : 18/205650  
DATED : June 24, 2025  
INVENTOR(S) : Kakeru Yamashita It is certified that error appears in the above-identified patent and that said Letters Patent is hereby corrected as shown below:

In the Claims

Column 14, Line 1, Claim 2, delete "according claim" and insert -- according to claim --.

Column 14, Line 7, Claim 3, delete "according claim" and insert -- according to claim --.

Column 14, Line 12, Claim 4, delete "according claim" and insert -- according to claim --.

Column 14, Line 16, Claim 5, delete "according claim" and insert -- according to claim --.

Column 14, Line 23, Claim 6, delete "according claim" and insert -- according to claim --.

Column 14, Line 30, Claim 7, delete "according claim" and insert -- according to claim --.

Column 14, Line 43, Claim 8, delete "according claim" and insert -- according to claim --.

Column 14, Line 48, Claim 9, delete "according claim" and insert -- according to claim --.

Column 14, Line 55, Claim 10, delete "according claim" and insert -- according to claim --.

Column 14, Line 62, Claim 11, delete "according claim" and insert -- according to claim --.

Column 15, Line 6, Claim 12, delete "according claim" and insert -- according to claim --.

Signed and Sealed this  
Twenty-sixth Day of August, 2025

Coke Morgan Stewart  
*Acting Director of the United States Patent and Trademark Office*